(12) United States Patent
Chen et al.

(10) Patent No.: US 7,502,947 B2
(45) Date of Patent: Mar. 10, 2009

(54) SYSTEM AND METHOD OF CONTROLLING A GRAPHICS CONTROLLER

(75) Inventors: Qijun Chen, Spring, TX (US); Rahul V. Lakdawala, Cypress, TX (US); Anura Neysadurai, Houston, TX (US); Donald G. Scharnberg, Pasadena, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 463 days.

(21) Appl. No.: 11/004,522

(22) Filed: Dec. 3, 2004

(65) Prior Publication Data

US 2006/0119603 A1     Jun. 8, 2006

(51) Int. Cl.
G06F 1/00 (2006.01)
(52) U.S. Cl. ......................... 713/300; 713/320; 345/502
(58) Field of Classification Search ......... 713/300–340; 345/502
See application file for complete search history.

(56) References Cited

U.S. PATENT DOCUMENTS

| | | | | |
|---|---|---|---|---|
| 4,922,448 | A * | 5/1990 | Kunieda et al. | 713/320 |
| 5,008,846 | A * | 4/1991 | Inoue | 713/321 |
| 5,159,683 | A * | 10/1992 | Lvovsky et al. | 710/9 |
| 5,559,525 | A * | 9/1996 | Zenda | 345/3.1 |
| 5,629,715 | A * | 5/1997 | Zenda | 345/3.1 |
| 6,072,465 | A * | 6/2000 | Maeda et al. | 345/156 |
| 6,704,879 | B1 * | 3/2004 | Parrish | 713/322 |
| 6,928,543 | B2 * | 8/2005 | Hendry et al. | 713/100 |
| 7,114,086 | B2 * | 9/2006 | Mizuyabu et al. | 713/320 |
| 7,231,529 | B2 * | 6/2007 | Park | 713/300 |
| 7,269,750 | B1 * | 9/2007 | Garritsen et al. | 713/322 |
| 2002/0149541 | A1 * | 10/2002 | Shin | 345/3.1 |
| 2002/0190920 | A1 * | 12/2002 | Kung | 345/3.1 |
| 2003/0142089 | A1 * | 7/2003 | Myers | 345/213 |
| 2004/0128571 | A1 * | 7/2004 | Saunders et al. | 713/300 |
| 2004/0178968 | A1 * | 9/2004 | Kizaki | 345/2.2 |
| 2004/0268168 | A1 * | 12/2004 | Stanley et al. | 713/320 |

OTHER PUBLICATIONS

Digital Display Working Group, "Digital Visual Interface DVI, Revision 1.0," Apr. 2, 1999, 76 pp.

* cited by examiner

*Primary Examiner*—Thomas Lee
*Assistant Examiner*—Vincent T Tran

(57) ABSTRACT

A system comprises a first graphics controller adapted to couple to a first display, a second graphics controller adapted to couple to a second display, and a switch through which at least one of communications and power is provided to the second graphics controller. The system also comprises control logic coupled to the switch. The control logic causes the switch to preclude at least one of communications and power from being provided to the second graphics controller if the second display is not operatively coupled to the system.

24 Claims, 4 Drawing Sheets

SYSTEM AND METHOD OF CONTROLLING A GRAPHICS CONTROLLER

BACKGROUND

It is generally desirable to reduce power consumption in computer systems. A notebook computer, for example, may operate from a battery. The less power the notebook consumes, the longer the battery will last. While battery-operated computers certainly benefit from a reduction in power consumption (in terms of longevity of battery charge), even desktop computers benefit from a reduction in power consumption. Desktop computers that consume less power generally do not become as hot and cost less to operate (in terms of energy costs).

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more components.

DETAILED DESCRIPTION

Some computer systems are equipped to permit multiple displays to be used. For example, a notebook computer has a built-in display and may have a graphics output connection to an optional separate display. A system that is capable of operating multiple displays simultaneously does not necessarily have more than one display connected to the system at all times. That is, a user may choose not to connect a second display to a multi-display-compatible computer and, instead, operate the system with only a single display. In accordance with various embodiments of the invention, the computer system described herein is capable of turning on and off power to circuitry associated with driving a display. If the display is connected, the associated circuitry is on and operational. Conversely, if the display is not present, the associated circuitry is not on and operational. By turning power off to the display-related circuitry when the display is not present, embodiments of the computer system consume less power than would otherwise be the case. Various embodiments of turning power off to display-related circuitry are disclosed below.

Figure 1:
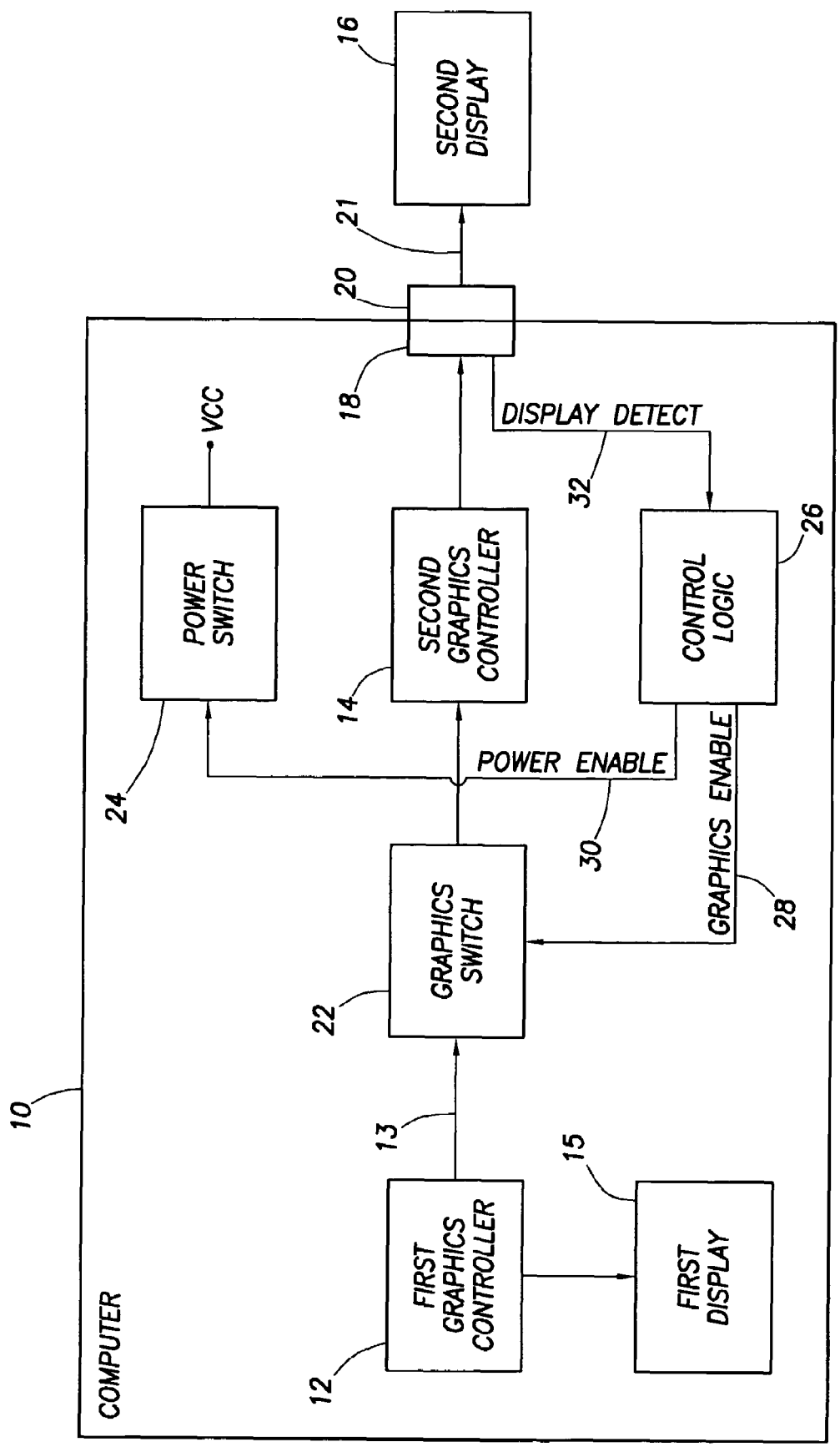
FIG. 1 shows a system in accordance with an embodiment of the invention.

FIG. 1 shows an embodiment of a computer 10 comprising a first graphics controller 12 and a second graphics controller 14. The first graphics controller 12 is adapted to couple to and control a first display 15. Similarly, second graphics controller 14 is adapted to couple to and control a second display 16 that is removable. The computer 10 may be implemented as any suitable computer, such as a notebook, portable, or desktop computer. As a notebook computer, the first display 15 may comprise the display built into the notebook computer. The second display 16 comprises an optional display that an operator of the computer may or may not desire to be coupled to the computer. If the second display 16 is coupled to the computer 10, the second graphics controller 14 is used to render information on the second display 16. Such information may be in the form of text and/or graphics. Each graphics controller can be any suitable type of graphics controller. In accordance with at least one embodiment of the invention, the first graphics controller is capable of interfacing to a video graphics adapter (VGA)-compatible display (e.g., first display 15). The second graphics controller 14 may comprise a digital visual interface (DVI) graphics controller for interfacing to a DVI-compatible display (e.g., second display 16).

A pair of connectors 18 and 20 are shown in FIG. 1 to permit the second display 16 to be connected to the computer 10. Connector 18 comprises a connector accessible from an exterior surface of the computer 10. Connector 20 is provided on a data cable 21 from the second display 16. When an operator of the computer desires to connect the second display 16 to the computer, the operator mates connectors 18 and 20 to thereby provide electrical connectivity from the computer 10 to the second display 16. In some embodiments, the second display 16 may be electrically coupled to the computer 10 by way of a docking station (not specifically shown in FIG. 1). One or more of the connectors 18, 20 may be provided on the docking station.

Referring still to FIG. 1, computer 10 also includes a graphics switch 22, a power switch 24, and control logic 26. Control logic 26 receives a DISPLAY DETECT signal 32 from connector 18. The state of the DISPLAY DETECT signal 32 indicates the presence or absence of the second display 16. Control logic 26 provides a pair of output enable signals 28 and 30 to the switches 22 and 24. A GRAPHICS ENABLE signal 28 is provided to the graphics switch 22 and a POWER ENABLE signal 30 is provided to the power switch 24. Via the enable signals 28 and 30, the control logic 26 is able to independently control the graphics switch 22 and power switch 24 depending on the state of the DISPLAY DETECT signal 32 and hence whether the second display 16 is operatively coupled to the system via connector 18. For example, if the second display 16 is not operatively coupled to the system, the control logic 26 determines this condition from the state of the DISPLAY DETECT signal 32 and controls switches 22 and/or 24 to turn communications and/or power off to the second graphics controller 14.

In the embodiments shown in FIG. 1, the first graphics controller 12 provides data, address, and control signals 13 through the graphic switch 22 to the second graphics controller 14. The second graphics controller 14 receives the signals 13 and generates appropriately formatted signals for the second display 16. The graphics switch 22 can be controlled by the control logic 26 via the GRAPHICS ENABLE signal 28 to enable or disable the flow of data and control signals 13 to the second graphics controller 14. That is, control logic 26 can cause the graphics switch 22 to preclude the signals 13 from reaching the second graphics controller 14 thereby precluding the graphics controller 14 from rendering images on a second display 16. The graphics switch 22 comprises one or more solid-state switches whose state (on or off) is dictated by the state of the GRAPHICS ENABLE signal 28.

Power (VCC) is provided through power switch 24 to the second graphics controller 14. The power that is provided through the power switch 24 to the second graphics controller 14 comprises power from which the second graphics controller 14 operates. The control logic 26 can cause power to be turned on or off to the second graphics controller 14 by asserting or deasserting the POWER ENABLE signal 30 to the power switch 24. As such, the control logic 26 can turn off the second graphics controller 14. Further, the control logic 26 can turn the second graphics controller 14 on and off independently of the first graphics controller 12. For example, the first graphics controller can remain on and operational to render information on the first display 15, while the control logic 26 turns the second graphics controller 14 off. With the first graphics controller on and the second graphics controller off, computer 10 can render information on the first display 15, but not the second display 16.

The functionality of the two enable signals 28 and 30 can be performed by a single enable signal as desired. Further, each enable signal 28 and 30 may be asserted high or low depending on the particular implementation of the control logic 26 and switches 22 and 24.

As noted above, the second display 16 may or may not be coupled to the computer 10 as desired by an operator of the computer. If no second display 16 is coupled to the computer 10, there is no need for the second graphics controller 14 to be on and operational. Accordingly, when the control logic 26 detects or otherwise determines that no second display 16 is coupled to the computer 10, the control logic asserts either or both of the enable signals 28 and 30 to the respective switches 22 and 24 to disable operation of the second graphics controller 14. That is, the control logic 26 can cause the second graphics controller to be powered off by way of POWER ENABLE signal 30 and of the power switch 24 which, in response to the enable signal 30, shuts power off to the second graphics controller 14. The control logic 26 can also preclude the signals 13 from reaching the second graphics controller 14 by way of graphics enable signal 28 and graphics switch 22. Computer 10 is thus able to reduce power consumption by turning off the second graphics controller 14 when the second graphics controller is not needed due to, for example, the lack of a second display 16 for the second graphics controller to operate.

Referring still to FIG. 1, a DISPLAY DETECT signal 32 is shown coupled between connector 18 and control logic 26. The DISPLAY DETECT signal 32 causes the control logic 26 to control the states of the enable signals 28, 30. The DISPLAY DETECT signal 32 can be asserted in accordance with any desired technique. In at least one embodiment, the DISPLAY DETECT signal is asserted (either asserted high or asserted low depending on the desired implementation) based on connecting connectors 18 and 20 together. In the embodiment in which the second graphics controller 14 is implemented as a DVI controller, the display detect signal 32 is implemented as the HOT PLUG DETECT (HPD) signal provided in the "Digital Visual Interface," Revision 1.0, Apr. 2, 1999, incorporated herein by reference. In general, mating data cable 21 having connector 20 to connector 18 causes the state of the DISPLAY DETECT signal 32 to change automatically to a logic high state (or low state depending on the implementation).

The embodiment of FIG. 1 thus is a computer system 10 comprising first and second graphics controllers 12, 14 adapted to couple to first and second displays 15 and 16. A dynamically-controllable power switch (power switch 24) is included to provide power to the second graphics controller 14 to thereby permit the second graphics controller to be controlled separately from the first graphics controller 12. The control logic 26 causes the power switch 24 to disable power to the second graphics controller 14 when the second display 16 is not connected to system 10. The system also includes a graphics switch 22 coupled between the first and second graphics controllers 12 and 14 to turn communications on and off to the second graphics controller 14.

Figure 2:
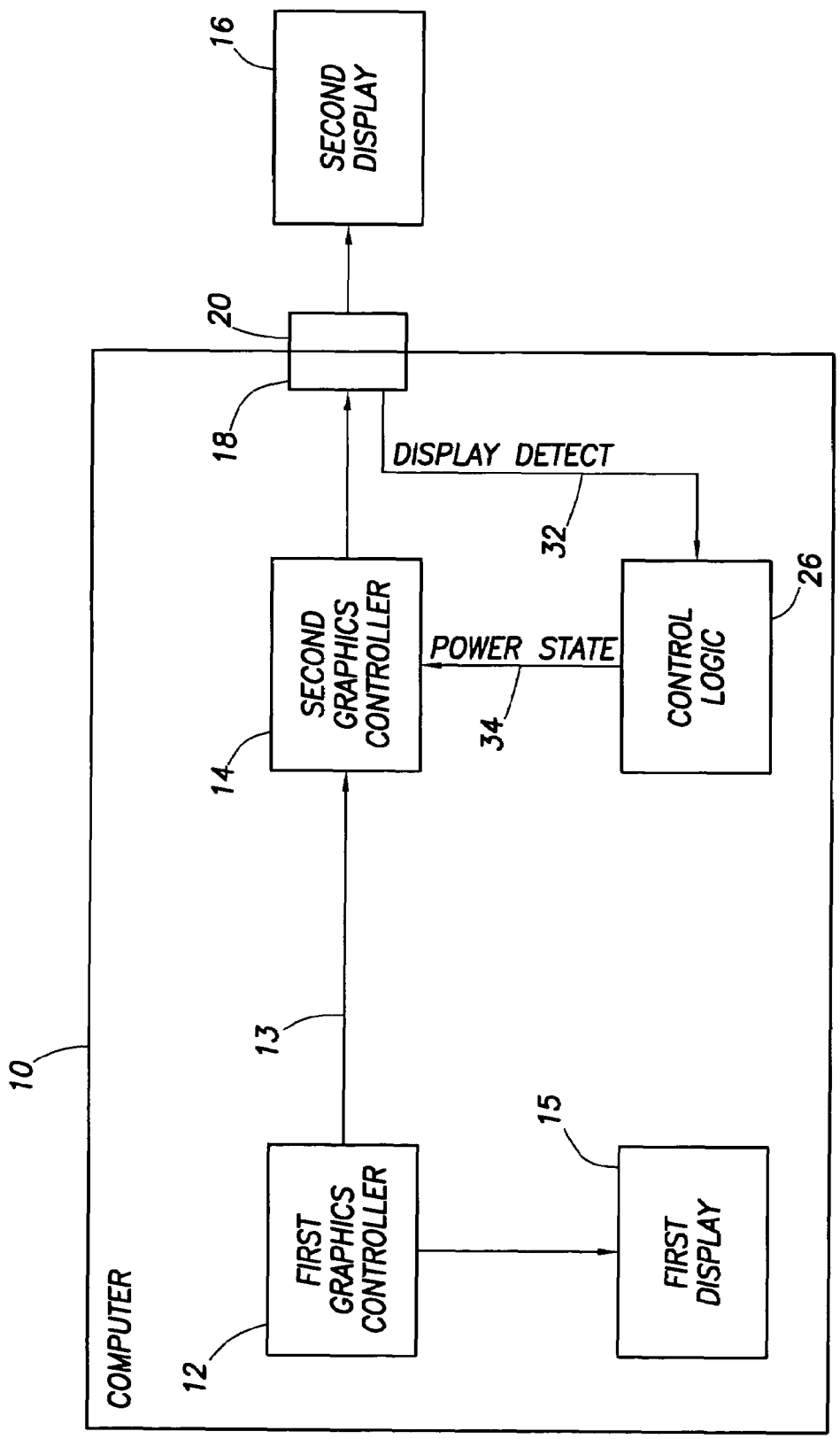
FIG. 2 shows an alternative embodiment in accordance with the invention.

FIG. 2 shows another embodiment of computer 10. In the embodiment of FIG. 2, computer 10 includes a first graphics controller 12 and the second graphics controller 14 coupled by way of data, address, and control signals 13. The DISPLAY DETECT signal 32 from connector 18 is provided to control logic 26 and as before, the DISPLAY DETECT signal 32 indicates whether the second display 16 is coupled to connector 18 as described above. In response to the state of the DISPLAY DETECT signal 32, the control logic 26 controls a POWER STATE signal 34 to the second graphics controller 14.

In the embodiment of FIG. 2, the second graphics controller 14 is capable of operating in any of a plurality of power states. One such power state may be a fully operational power state. Another power state may be a lower power state in which the second graphics controller is not capable of performing all of the functions that it can perform while in the fully operational power state. While in the lower power state, the second graphics controller naturally consumes less power than in the fully operational power state. The second graphics controller is transitioned to one of the lower power states if the display 16 is not coupled to the system. In some embodiments, the second graphics controller 14 may comprise more than the preceding two power states. For example, the second graphics controller 14 may comprise a plurality of lower power states, each lower power state capable of permitting the second graphics controller to perform a different set of functions. Further, in some embodiments, the second graphics controller 14 is capable of being in any of a plurality of power states from fully operational to off. The POWER STATE signal 34 is an input signal to the controller 14 and dictates the power state of the second graphics controller, thereby causing the controller to be in a specific power state.

When the second display 16 is coupled to connector 18, the DISPLAY DETECT signal 32 is at a state that indicates to the control logic 26 that the display 16 is present. In response, the control logic 26 controls the state of the POWER STATE signal 34 to the second graphics controller 14 to ensure that the second graphics controller 14 is in a fully operational state to permit information to be displayed on the second display 16. If the second graphics controller 14 was previously in a lower power state, the control logic 26 causes the second graphics controller 14 to transition to a fully operational state.

Figure 3:
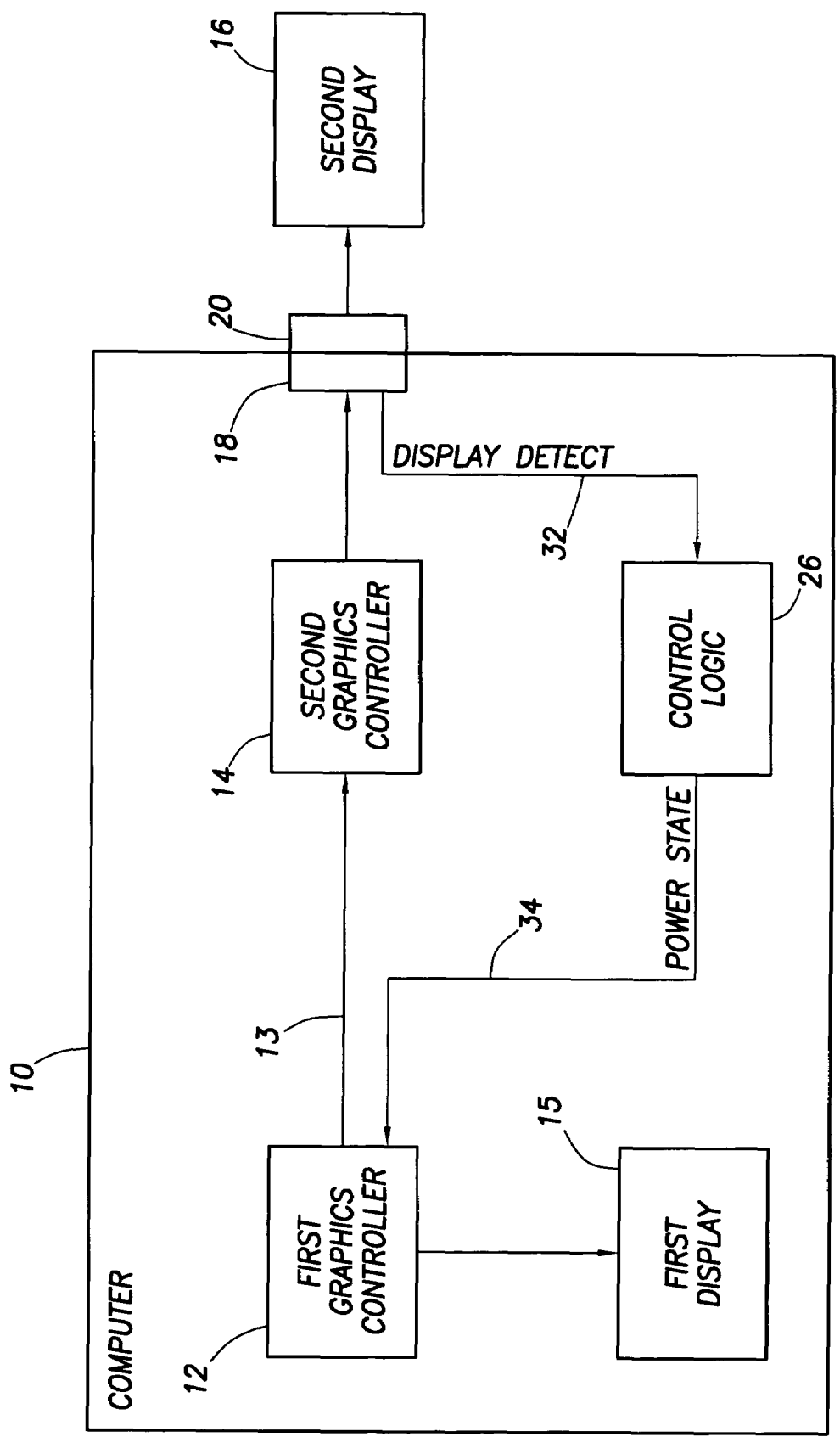
FIG. 3 shows yet another embodiment in accordance with the invention.
Figure 4:
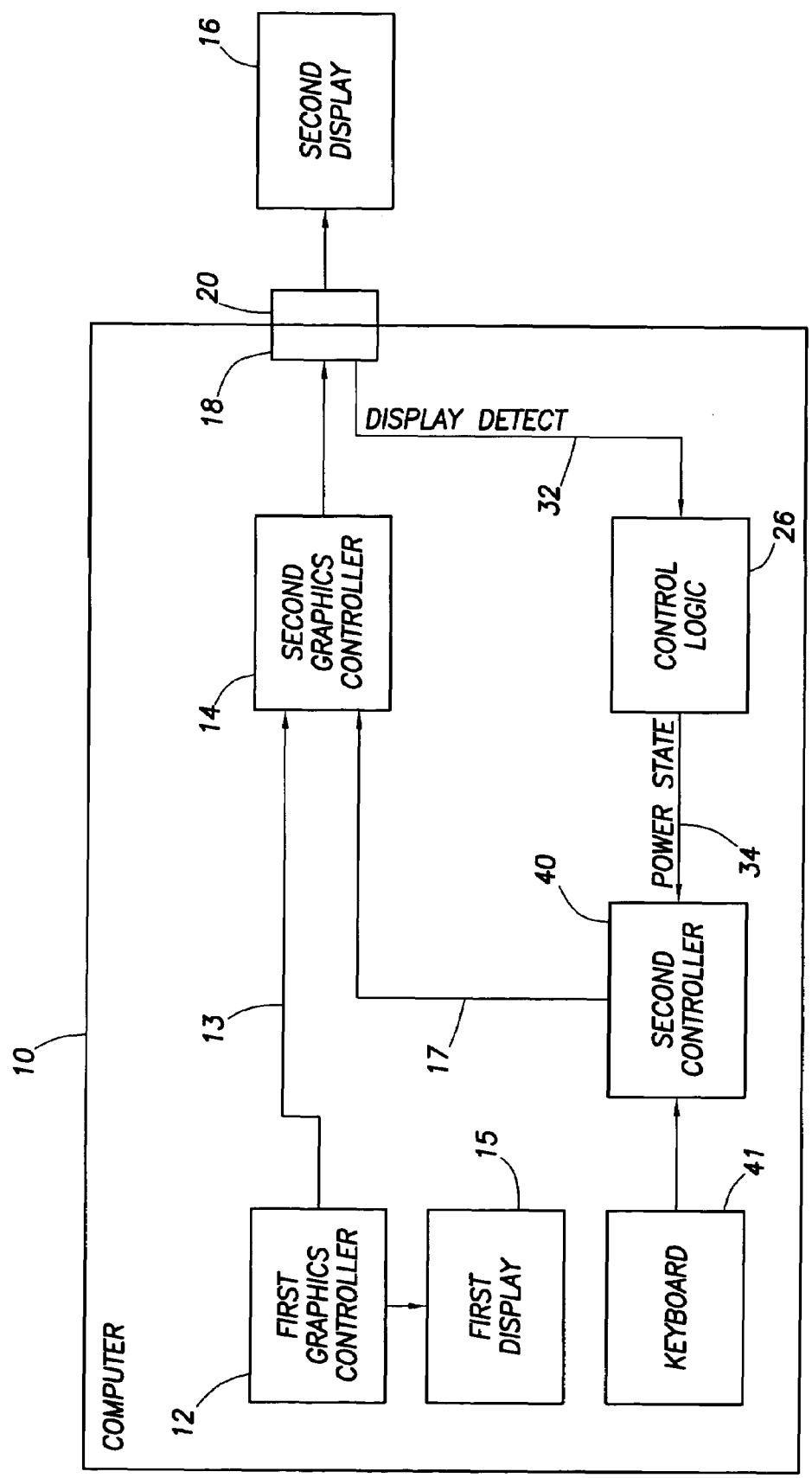
FIG. 4 shows yet another embodiment in accordance with the invention.

FIGS. 3 and 4 show additional embodiments of how control logic 26 can control the power state of the second graphics controller 14. In FIG. 3, the control logic 26 asserts the POWER STATE signal 34 (described above) to the first graphics controller 12. As explained above, the control logic 26 asserts the POWER STATE signal 34 to one state if the DISPLAY DETECT signal indicates the absence of the second display 16 or to another state if the DISPLAY DETECT signal indicates the presence of the display 16. The first graphics controller 12 receives the POWER STATE signal 34 and issues a corresponding command to the second graphics controller 14 via signals 13 to control the power state of the controller 14. The transmitted command may be for the second graphics controller 14 to be in a fully operational state or in one or more reduced power states. As such, if the control logic 26 detects that the second display 16 is absent, the control logic asserts the POWER STATE signal 34 to a first state that causes the first graphics controller 12 to issue a command to the second graphics controller 14 to thereby cause the second graphics controller to transition to a lower power state. If, however, the control logic 26 detects that the second display 16 is coupled to connector 18, the control logic 26 asserts the POWER STATE signal 34 to a second state which causes the first graphics controller 12 to issue a command to the second graphics controller 14 to cause a second graphics controller 14 to transition to a fully operational state. The second display 16 can be coupled to or removed from connector 18 while the computer 10 is operational. Accordingly, the control logic 26 in the embodiment of FIG. 3, as well in any of the other embodiments disclosed herein, can dynamically control the operation of the seconds graphic controller 14 while the computer 10 is operational and independent of the operation of the first graphics controller 12.

In the embodiment of FIG. 4, another controller 40 is included. The controller 40 may perform any of a variety of functions such as battery management if a battery is present in the system. In some embodiments, the controller 40 may be a keyboard controller that receives input signals from a keyboard 41. Additionally or alternatively, the controller 40 performs the functions attributed to it as described below. The controller 40 receives the POWER STATE signal 34 from the control logic 26. The POWER STATE signal 34 may be controlled in the same way as described above with respect to FIG. 3. In response to the received state of the POWER STATE signal 34, the controller 40 in the embodiment of FIG. 4 issues commands to the second graphics controller 14 via signals 17. The commands issued by the controller 40 to the second graphics controller 14 may be of the same format and convey the same information as the commands provided by the first graphics controller 12 as described above with respect to FIG. 3. In the embodiment shown in FIG. 4, the control logic 26 receives the DISPLAY DETECT signal 32 from connector 18. In other embodiments, the controller 40 may receive the DISPLAY DETECT signal 32 directly from connector 18 and control logic 26 need not be included.

For any of the embodiments disclosed above, the logic that causes the second graphics controller to be disabled and disabled (control logic 26 and/or controller 40) can perform this function at any suitable time such as during initialization or during run-time. During initialization, the control logic 26 (or controller 40), for example, is informed or otherwise detects whether the second display 16 is present and on the basis of whether the display 16 is operatively coupled to the computer, the control logic 26 causes the second graphics controller 14 to be disabled or transition to a suitable power state (lower power state if no second display is present or higher power state if a second display is present). During run-time, the control logic 26 (or controller 40) can dynamically disable the second graphics controller as the second display 16 is coupled to or removed from the computer.

In some embodiments, the second graphics controller is enabled and powered on if the second display is connected to computer 10 even if the second display is powered off. In other embodiments, the second display must be connected and powered on for the computer 10 to enable the second graphics—otherwise, the second graphics controller will be disabled and/or powered off.

The above discussion is meant to be illustrative of the principles and various embodiments of the present invention. Numerous variations and modifications will become apparent to those skilled in the art once the above disclosure is fully appreciated. For example, the systems disclosed herein can implement the High Bandwidth Digital Content protection scheme for the graphics data provided to the second display 16. It is intended that the following claims be interpreted to embrace all such variations and modifications.

What is claimed is:

1. A system, comprising:
 a first graphics controller adapted to couple to a first display;
 a second graphics controller adapted to couple to a second display;
 a graphics switch through which communications are provided to said second graphics controller;
 a power switch through which power is provided to said second graphics controller; and
 control logic coupled to the switch, said control logic causes said switch to preclude at least one of communications and power from being provided to said second graphics controller if the second display is not operatively coupled to said system.

2. The system of claim 1 wherein said control logic is adapted to receive a detect signal that indicates whether the second display is operatively coupled to said system.

3. The system of claim 1 wherein said control logic asserts an enable signal to said switches based on a detect signal.

4. The system of claim 1 wherein the control logic causes said switch to disable power to said second graphics controller.

5. The system of claim 1 wherein said system comprises a connector adapted to be coupled to the second display and, upon coupling the second display to said connector, said control logic causes said switches to enable communications and power to be provided to said second graphics controller.

6. The system of claim 1 wherein if the second display is operatively coupled to said system during run-time, said control logic dynamically causes said switches to enable communications and power to be provided to said second graphics controller and, if the second display is operatively removed said system during run-time, said control logic dynamically causes said switches to preclude communications and power from being provided to said second graphics controller.

7. The system of claim 1 wherein said switches are dynamically-controllable during run-time of said system.

8. A system, comprising:
 a first graphics controller adapted to couple to a first display;
 a second graphics controller adapted to couple to a second display via a connector;
 a power switch that provides power to said second graphics controller;
 a graphics switch that provides graphics data to said second graphics controller; and
 control logic coupled to the connector and to the power and graphics switches, said control logic causes said switches to disable power and graphics data to said second graphics controller if the second display is not coupled to said connector.

9. The system of claim 8 wherein said power switch allows power to be provided to said second graphics controller separately from power to said first graphics controller.

10. The system of claim 8 wherein, through said graphics switch, data signals pass from the first graphics controller to said second graphics controller.

11. The system of claim 8 wherein the control logic causes said power switch to disable power to said second graphics controller while said first graphics controller continues to be powered on.

12. The system of claim 8 wherein, upon coupling the second display to said connector, said control logic causes said power switch to enable power to said second graphics controller.

13. A system, comprising:
a first graphics controller adapted to couple to a first display;
a second graphics controller adapted to couple to a second display; and
control logic coupled to the second graphics controller and said control logic causes said second graphics controller to be in one of a plurality of power states based on whether the second display is operatively coupled to the system, at least two of said power states causing the second graphics controller to be operational, the control logic causing said second graphics controller to be in one of the plurality of power states by asserting a signal to the first graphics controller which, in turn, transmits a command to the second graphics controller, said command dictating the particular power state for the second graphics controller.

14. The system of claim 13 wherein said first graphics controller provides data to said second graphics controller to be displayed on the second display.

15. The system of claim 13 wherein said second graphics controller can be in a different power state than the first graphics controller.

16. The system of claim 13 wherein, upon determination that the second display is not operatively coupled to the system, said control logic causes said second graphics controller to transition to a lower power state.

17. The system of claim 16 wherein, upon a subsequent determination that the second display is operatively coupled to said system, said control logic causes said second graphics controller to transition out of the lower power state.

18. The system of claim 13 wherein the control logic receives a display detect signal from said connector, said display detect signal indicates whether the second display is operatively coupled to the system, and, on the basis of the display detect signal, said control logic asserts a control signal to said second graphics controller to cause said second graphics controller to be in a particular power state from among the plurality of power states.

19. The system of claim 13 wherein the control logic comprises a keyboard controller.

20. A system, comprising:
a first graphics means for providing graphics signals to a first display;
a second graphics means for providing graphics signals to a removable second display via a connector;
first means for disabling power to said second graphics means if the second display is not coupled to said connector; and
second means for disabling data signals from being provided to said second graphics controller.

21. A method, comprising:
determining whether a second display is connected to a system that also comprises a first display, said first display being operated by a first graphics controller;
if the second display is connected to the system, operating a power switch to cause power to be provided to the second graphics controller and operating a graphics switch to cause communications to be enabled to the second graphics controller; and
if the second display is not connected to the system, operating the power switch to cause power to be off to the second graphics controller and operating the graphics switch to disable communications to the second graphics controller.

22. The method of claim 21 further comprising maintaining power to the first graphics controller while disabling power from the second graphics controller.

23. A method, comprising:
determining whether a second display is connected to a system that also comprises a first display, said first display being operated by a first graphics controller;
if the second display is connected to the system, the first graphics controller causing a second graphics controller, which is adapted to provide information to the second display for display thereon, to be in a fully operational state; and
if the second display is not connected to the system, the first graphics controller causing the second graphics controller to be operational but in a lower power state relative to the fully operational state.

24. The method of claim 23 further comprising transitioning the state of the second graphics controller between the fully operational state and lower power state depending on whether the second display is connected to the system during system run-time.

* * * * *